W. Bell,
Bedstead Fastening.
Nº 606. Patented Feb. 15, 1838.

Inventor;
W. Bell

UNITED STATES PATENT OFFICE.

WILLIAM BELL, OF LEXINGTON, KENTUCKY.

METHOD OF FASTENING BEDSTEADS.

Specification of Letters Patent No. 606, dated February 15, 1838.

*To all whom it may concern:*

Be it known that I, WILLIAM BELL, of the city of Lexington, State of Kentucky, have invented a new Bedstead; and I declare the following to be a full and exact description thereof.

Figure 1:
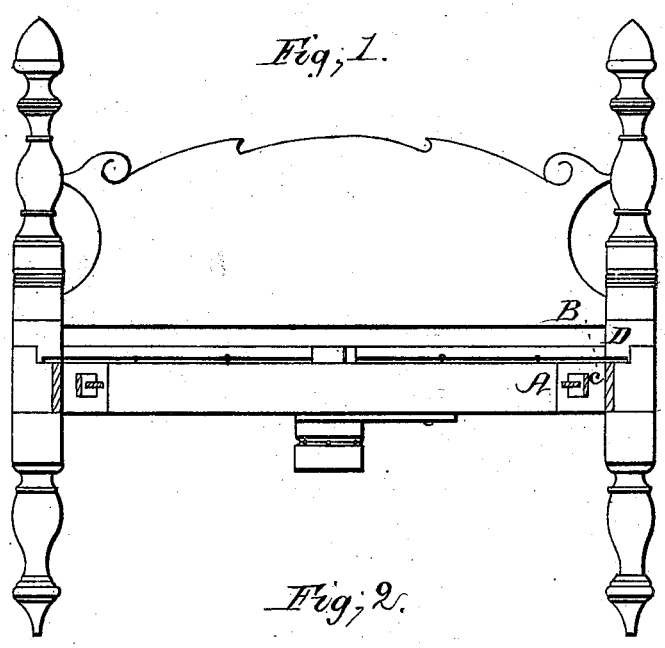
Figure 2:
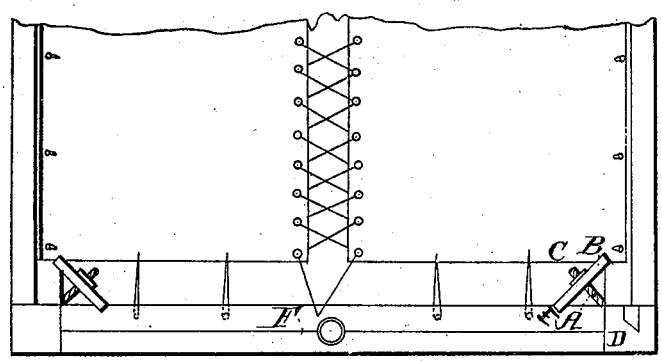

In the plate A or drawing accompanying this specification signed by me, and in Figures 1 and 2 is a representation of my invention, which consists in a new fastening together of the posts and rails by means of a screw, block and nut or pin, block and key. At the post D an iron or wooden pin is inserted into the interior corner of the post, with a screw on its end, or is let into said post from the exterior corner, and passed diagonally through to the interior corner having a head to hold it on the outer end, and screw to receive a nut on the interior end; over which pin is inserted a wooded block B either oblong or square having a hole in its center large enough for the pin to pass through, and fitting into notches cut into the rail, on each side of the post, and fastened by a nut C on the end of the iron pin. The rails are inserted into suitable mortises, in the posts, by tenons either round or square, as in No. 2, where is shown the manner in which the rails are joined together. As the nut C is turned on the block B the rails and post are drawn tight and held square the ends of the block holding in the notches prepared for them. At the pleasure of the workman the screw may be omitted, and an iron pin or key may be driven into a suitable opening made in the iron pin and thus hold the block post as by the screw and nut.

I claim—

The improvement in the foregoing bedstead as my invention, viz. the fastening the posts to the rails by means of a screw and nut on an iron or wooden pin driven diagonally into or through each post, or varied by a key and mortise as described in the foregoing specification, and desire Letters Patent therefor.

WM. BELL.

Witnesses:
McM. McCALLA,
CHARLES J. HEMPHILL.